United States Patent Office 3,484,417
Patented Dec. 16, 1969

3,484,417
POLYSULFHDRYLATED POLYMERS PREPARED FROM THE REACTION OF MALEIC ACID ANHYDRIDE COPOLYMERS AND AMINOTHIOLS
Gregoire Kalopissis and Constantin Aretos, Paris, France, assignors to Societe Anonyme dite: L'Oreal
No Drawing. Continuation-in-part of applications Ser. No. 267,851, Mar. 25, 1963, and Ser. No. 520,075, Jan. 12, 1966. This application Apr. 25, 1967, Ser. No. 633,394
Claims priority, application France, Mar. 28, 1962, 892,586
Int. Cl. C08f 27/06; A61k 7/10
U.S. Cl. 260—78.5      6 Claims

ABSTRACT OF THE DISCLOSURE

Water soluble polysulfhydrylated polymers which are improved compounds to treat and permanently deform keratinic fibers and hair.

---

This application is a continuation-in-part application of application 267,851, filed Mar. 25, 1963 now abandoned and application 520,075, filed Jan. 12. 1966.

The use of the polymers of this invention in one step hair waving compositions is disclosed in application No. 360,730, filed Apr. 17, 1964 now Patent No. 3,238,588.

The present invention pertains to related polymers of medium molecular weight having chains containing thiol functional groups.

The use of the lower thiols, especially α-mercaptocarboxylic acids, such as thioglycolic or thiolactic acid, for the treatment of keratinic fibers is well known. When these thiols react with the —S—S linkages of the keratin they transform themselves into the corresponding disulfides, which are of small molecular dimensions and soluble in water, and easily eliminated during washing of the fiber. Thus they have no physical effect on the original keratin.

It has now been found that if polymers which are soluble in water, alcohol and organic solvents and comprise sulfhydryl groups in their molecular chains, that is to say polysulfhydrylated polymers, are used instead of low molecular weight thiols, the polydisulfiides formed, either by oxidation due to the action of an outside agent or by oxidation inherent in the process of reacting with the keratin, become insoluble in the solvent. For this reason the action of the polysulfhydrylated polymers on the keratin is accompanied by a supplemental deposit of polymeric material. This decrease in solubility which accompanies the action of the polysulfhydrylated polymers on the fibers presents certain advantages, namely: the improvement of the mechanical properties of the treated fibers, the possibility of keeping a fiber in a selected position after it has been subjected to the chemical action of the polysulfhydrylated polymers in question, etc. In other words, when keratinic fibers are treated with polysulfhydrylated polymers, there is a conjoint chemical and physical action and fibers having improved mechanical properties are usually obtained.

The process of treating keratinic fibers with the polymers of the invention results in imparting both improved mechanical properties and permanent deformation to these fibers.

An object of this invention is to produce a new class of polysulfhydrylated polymers.

Another object of this invention is to produce polysulfhydrylated polymers that are soluble in water and which are particularly desirable for treating keratinic fibers and human hair.

In general these polymers may be obtained by starting with previously prepared polymers having in their chains functional reactive groups which are sufficient to permit a thiol group to be introduced in the usual known manner.

Among those polymers particularly suited for use as points of departure for the preparation of polysulfhydrylated polymers to be used according to the invention are the polymers comprising ab initio as a reagent group, the following:

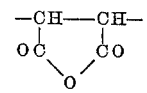

As is well known, this group is present in those polymers which are produced by the copolymerization of maleic anhydride with a copolymerizable monomer, that is to say, one having an active double linkage.

Illustrative examples of polymers which may be used as points of departure when preparing the polysulfhydrylated polymers according to the invention include:

(a) The copolymers of an aliphatic or aromatic vinylic ether and maleic anhydride, and particularly the copolymers of vinylmethylether, vinylethylether, or vinylphenylether and maleic anhydride.

(b) The copolymers of an aromatic vinylic composition and maleic anhydride, and particularly the copolymers of styrene or its homologs and maleic anhydride.

(c) The copolymers of a monoolefine and maleic anhydride, and particularly the copolymers of ethylene and maleic anhydride.

Since it is most desirable to have the maximum number of reactive groups,

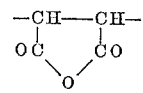

in the molecule of the copolymer used in order to permit the introduction of the largest possible number of thiols, those copolymers in which the ratio between the maleic anhydride and the monomer of the type described (having two active bonds) approaches unity are preferred.

The degree of polymerization $n$ of the different polymers used may vary within wide limits and this is a factor which must be taken into account, depending upon the family of polymers employed.

In effect, the choice of the degree of polymerization $n$ depends on the one hand on the ability of the polymer under consideration to penetrate into the fiber, and on the other hand, on the need for utilizing polymers which are soluble in a selected solvent, such as water, at a basic pH, on the permeability of the fiber to be treated, and the conditions of application (temperature, etc.). Thus, for example, when a styrene/maleic anhydride copolymer is to be dissolved in an aqueous basic pH solution the degree of polymerization should not be greater than about 20.

It is evident that it is impossible to give exact values for all the solvent and polymer combinations envisaged in the present application, but if aqueous solutions are used, it may be said in a general way that the average molecular weight of the starting polymer used should be less than about 4000.

The introduction of the thiol group into the said polymers may be carried out advantageously by reaction with an aminothiol of the formula HS—R—NHR′, in which R designates an alkylene radical comprising preferably from 2 to 4 carbon atoms, which may be substituted by alkyl radicals which may have up to 4 carbon atoms, a carboxyl group or a carbalkoxy group and R′ represents hydrogen or an alkyl group such as $CH_3$, $C_2H_5$, etc.

Among the aminothiols which may be advantageously used in carrying out the present invention, the following may be listed:

β-Mercaptoethylamine, N - methyl β-mercaptoethylamine, cysteine, ethylcysteinate, etc.

The reaction with respect to the reactive anhydride group takes place as follows to produce a polymer of the general type I:

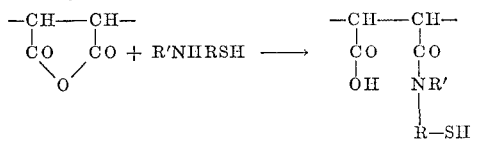

R and R' have the meaning disclosed above. The polymers thus obtained have a carboxy and a thiol, are soluble in water in salt form with alkaline metals, ammonia, or amines.

In general the preferred polymers of Group I are:

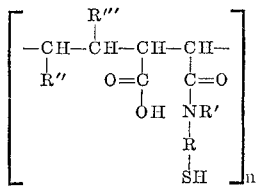

in which R″ and R‴ are hydrogen, lower alkyl, phenyl or lower alkoxy and $n$ is an integer less than 25 for water soluble polymers and a molecular weight of less than 6000, but $n$ may be higher for other solvents.

Low molecular weight polymers soluble in basic aqueous solutions are preferred for use on human hair. Higher molecular weight polymers, soluble in organic solvents, may be used on fibers, such as wool. The polymers are preferably used in compositions having a pH above 4.5.

The following examples illustrate the preparation of type I polymers:

EXAMPLE 1

50.5 grams, or 0.25 gram molecules of the unit structure of styrene/maleic anhydride copolymer in which the number $n$ is equal to 8 (a copolymer commercially known as resin SMA 1000 A of the Texas Butadiene Chemical Corp.) is dissolved in 200 cc. of anhydrous acetone. This product is started to have styrene monomer/maleic anhydride ratio of 1:19.9. 0.225 gram molecules of $\beta$-mercaptoethylamine hydrochloride is added to this solution at room temperature under a nitrogen atmosphere. 0.225 gram molecules of triethylamine in solution in 50 cc. of acetone is then added slowly, while keeping the temperature between 15 and 20° C. The mixture is then boiled for three hours. The triethylamine hydrochloride formed in this manner is drained after cooling and washed with a little acetone.

The acetonic filtrate is evaporatde until dry under a subatmospheric pressure and a nitrogen atmosphere. The residue obtained is purified by dissolving it in a 10% solution of NaOH and reprecipitating it, after drying, by means of a dilute solution of hydrochlorid acid; this yields 60 grams the desired sulfhydryl polymer in the form of a white powder which is then vacuum dried.

*Analysis.*—The product thus obtained was subjected to the following tests: (The sulfhydryl group is calculated on the basis of a styrene monomer/maleic anhydride ratio of 1:10.9.)

Determination of sulfhydryl group content (a) SH percent calculated, 10.62; SH percent found, 5.07.

(b) SH after reduction of the oxidized form eventually present in the product: SH percent calculated, 10.62; SH percent found, 6.25.

It clearly follows from these tests that the polymer obtained has a large part of its sulfhydryl groups in the free state.

EXAMPLE 2

20.3 g. or 0.1 gram-molecules of the unit structure of maleic anhydride/styrene copolymer in which the number $n$ is equal to 4 (commercially known as resin SMA 400 A of the Texas Butadiene Chemical Corp.) is dissolved in 200 cc. of anhydrous acetone. A preliminary acidimetric testing of this product indicates that the anhydride group is present in a proportion of only 84%.

0.84 gram-molecules of $\beta$-mercaptoethylamine hydrochloride is added to this solution, and while agitating it under a nitrogen atmosphere an acetonic solution of 0.84 gram-molecules of triethylamine is added drop by drop, while keeping the temperature at 15–20° C. After this addition, the mixture is brought to reflux for two hours, and the triethylamine hydrochlorate deposited is then dried. The acetonic filtrate is evaporated until dry in a nitrogen atmosphere under sub-atmospheric pressure. The residue obtained is purified by dissolving it in a 10% solution of NaOH and reprecipitating it after drying with a dilute solution of hydrochloric acid. This yields 18 grams of the desired sulfhydrylated polymer in the form of a white powder, which is then vacuum-dried.

*Analysis.*—The product thus obtained was subjected to the following tests: (The sulfhydryl group is calculated on the basis of a styrene/maleic anhydride ratio of 1:0.84.)

Determination of sulfhydryl group (a) SH percent calculated, 9.92; SH percent found, 4.13.

(b) SH after reduction of the oxidized form eventually present in the product: SH percent calculated, 9.92; SH percent found, 5.07.

Example 3

20.2 grams, 0.1 gram-molecule of the unit structure of the maleic anhydride/styrene copolymer, in which the number $n$ is equal to 8 (a copolymer which is commercially known as resin SMA 1000 A of the Texas Butadiene Chemical Corp.) is dissolved in 150 ml. of anhydrous acetone. This product is given as having a styrene monomer/maleic anhydride ratio of 1:0.9. 0.9 gram-molecules of cysteine hydrochloride are added to this solution at room temperature and under a nitrogen atmosphere. Then 0.9 gram-molecules of triethylamine in solution in 50 cc. of acetone is added slowly, while keeping the temperature between 15 and 20° C. and the mixture is then boiled for three hours. The triethylamine hydrochloride thus obtained is drained after cooling, and washed with a little acetone.

The acetonic filtrate is evaporated until dry under a nitrogen atmosphere at a sub-atmospheric pressure. The residue thus obtained is purified by dissolving it in a 10% solution of NaCH and reprecipitating it, after drying, by means of a dilute solution of hydrochloric acid. 24 g. of the desired polymer are thus obtained in the form of a white powder, which is then vacuum dried.

*Analysis.*—The product thus obtained is subjected to the following tests: (The sulfhydryl group is calculated on the basis of styrene monomer/maleic anhydride ratio of 1:0.9).

Determination of sulfhydryl group content (a) SH percent calculated, 9.57; SH percent found, 2.5.

(b) SH after reduction of the oxidized form eventually present in the product: SH percent calculated, 9.57; SH percent found 2.61.

Example 4

There is used in this preparation the maleic anhydride/styrene copolymer having a molecular weight of about 3000, obtained by copolymerization of styrene with maleic anhydride, in equimolecular proportions, and in the presence of benzoyl peroxide as an activator and normal butyl mercaptan as a regulator, in a conventional manner, by heating to 70–72° C. for 5 hours.

Acidimetric analysis of the product indicates that the anhydride group is present in the proportion of 74%.

15 grams, or 0.074 gram-molecules of the unit structure of this copolymer are dissolved in 150 cc. of acetone and 0.148 gram-molecules of $\beta$-mercaptoethylamine hydrochloride are added to it at room temperature under a nitrogen atmosphere. 0.148 gram-molecules of triethylamine in solution in 50 cc. of acetone are then added slowly, while stirring and keeping the temperature between 15 and 20° C. The mixture is boiled for three hours and evaporated until dry under a nitrogen atmosphere and sub-atmospheric pressure. The residue thus obtained is purified by dissolving it in a 10% solution of NaOH and reprecipitating it by means of a dilute solution of hydrochloric acid. 16 grams of the desired polymer are obtained in the form of a white powder, which is vacuum-dried.

*Analysis.*—The product thus obtained is subjected to the following tests: (The sulfhydryl group is calculated on the basis of a styrene monomer/maleic anhydride ratio of 1:0.74.)

Determination of sulfhydryl group (a) SH percent calculated, 8.76; SH percent found, 4.1.

(b) SH after reduction of the oxidized form eventually present in the product: SH percent calculated, 8.76; SH percent found, 5.65.

It follows clearly from these tests that the polymer obtained has a very high proportion of sulfhydryl groups in the free state.

Example 5

6.5 grams of sodium hydroxide, or 0.16 gram-molecules are dissolved in 60 ml. of water. Temperature is brought to 20° C. and 19 grams of β-mercaptoethylamine hydrochloride (0.168 gram-molecules) are added. Temperature is maintained at 20° C. and 12.6 grams of the maleic anhydride/ethylene copolymer (known as resin DX-840-11 of the Monsanto Company) are added by small quantities. For this product (DX840-11), the ethylene monomer/maleic anhydride ratio is 1:0.81.

The addition being completed, 25 ml. of 40% sodium hydroxide are added and precipitation of the polysulfhydrylated polymer is effected by acidification with a concentrated solution of hydrochloric acid.

If desired, an extra purification of the product can be effected by dissolving it again in an alkaline solution (sodium hydroxide) and reprecipitating it in an aqueous solution of hydrochloric acid. A resilient body is thus obtained which is dried under vacuum. Yield: 75%.

*Analysis.*—The product thus obtained is subjected to the following tests: (The sulfhydryl group is calculated on the basis of an ethylene monomer/maleic anhydride ratio of 1:0.81.)

Determination of sulfhydryl group (a) SH percent calculated, 14.25; SH percent found, 8.75.

(b) SH after reduction of the oxidized form eventually present in the product: SH percent calculated, 14.25; SH percent found, 9.5.

The properties of resistance to deformation conferred upon fibers by treatment with the solution of polysulfhydryl polymers according to the invention are of value in both the cosmetic field and the textile field, for example, that of wool.

The polysulfhydrylated polymers are particularly valuable when used for the permanent waving of keratinic fibers. In effect, in this case, fixation by means of oxidizing agents is unnecessary. As indicated above, the polysulfhydrylated polymers are capable of transformation either at the moment at which they reduce the K—S—S—K residues of the keratin, or by oxidation in the air, into relatively insoluble reticulated disulfides, and their molecular weight is at least doubled. The deposit of these polydisulfide polymers in and on the fiber confers on it a solid coating which is sufficient to keep it in its new position for a sufficiently long time to permit the oxygen of the air to complete the reconstitution of the K—S—H into K—S—S—K.

The concentration of the polysulfhydrylated polymers in the compositions for the treatment of keratinic fibers, according to the invention, is preferably between 1 and 20%.

Several examples of using the polysulfhydrylated polymers of this invention will now be described:

Example 6

A solution having the following composition is prepared:

Polymer resulting from the reaction of β-mercaptoethylamine with the copolymer of styrene and maleic anhydride obtained as in Example 1 _____ g__ 20
Urea _____ g__ 5
Ammonia q.s.p. _____ pH__ 9.8–9.9
Water q.s.p. _____ cc__ 100

The hair is impregnated with this solution and rolled upon curlers in the conventional manner employed for permanent waving.

Each lock of hair is saturated with said solution. After leaving this solution in contact with the hair for from 10 to 15 minutes, it is carefully rinsed with warm water and fixed with a 1.8% solution of hydrogen peroxide. After five minutes of contact with this oxidizing solution, the hair is again copiously rinsed. This process yields permanently waved hair having excellent stability against both humidity and the passage of time.

EXAMPLE 7

The hair is impregnated with the same solution as the one described in Example 6 and under the same conditions in order to permanently wave it, except that no oxidizing solution is applied. After the period of contact, it is sufficient to copiously rinse the hair for at least two minutes with warm water. This yields a permanent wave which is of good quality and long lasting.

EXAMPLE 8

The alkaline solution of the polymer described in Example 1 and hereinbefore described also yields excellent results when used for warm permanent waves. For this purpose the operator applies to each curler conventional means used to heat them to a temperature between 65 and 90° C. This produces, after unrolling and without any application of oxidizing lotion, a very pronounced and durable permanent wave.

EXAMPLE 9

A solution having the following composition is prepared:

Polymer resulting from the reaction of β-mercaptoethylamine with the copolymer of styrene and maleic anhydride obtained as in Example 2 ____g__ 15
Ammonia q.s.p. _____ pH__ 9.8
Water q.s.p. _____ cc__ 100

This solution is applied to the hair in the manner described in Examples 6 and 7 and the result is a permanent wave of very good quality.

EXAMPLE 10

The hair is impregnated with either the solution described in Example 6 or that of Example 9 and a conventional permanent waving process is then carried out. This results in a permanent deformation of the hair which imparts to the resulting "wave" an appearance and durability substantially superior to those obtained by conventional means. In the course of this waving operation, which comprises the steps of moistening, rolling on curlers, and drying, the excess ammonia evaporates.

A portion of the polydisulfides which have been formed remain on the fibers, thus imparting to the hair the properties hereinbefore described, by a method which is very easy to carry out.

EXAMPLE 11

A solution as follows is prepared:

| | |
|---|---|
| Polymer resulting from the reaction of β-mercapto-ethylamine with the ethylene/maleic anhydride copolymer obtained as per Example 5 _____ g__ | 16 |
| Urea _____ g__ | 5 |
| Ammonia q.s.p. _____ pH__ | 9.7 |
| H₂O q.s.p. _____ cc__ | 100 |

The hair is impregnated with this solution and is rolled up on the curlers utilizing the conventional process for permanent waving.

Every curl is saturated with the above solution and thoroughly rinsed after a time of contact between 10 and 15 minutes. A permanent deformation of hair is thus obtained, possessing a good stability towards both humidity and the passage of time.

Turning now to the polysulfhydrylated polymers identified as type II, they have the following formula:

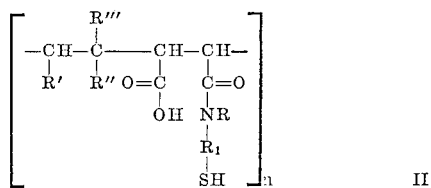
II in which:

$R_1$ designates an alkylene radical having preferably from 2 to 4 carbon atoms, which may be substituted by lower alkyls having up to 4 carbon atoms, by a carboxyl radical, or by a carbalkoxy group;

R represents a hydrogen atom or a lower alkyl such as $CH_3$ or $C_2H_5$;

R' and R'' represent a hydrogen atom, a lower alkyl radical, a phenyl radical, or a lower alkoxy radical, with R' and R'' either identical or different; R''' represents an —$OCOCH_3$ radical, a —$COOCH_3$ radical, or a —CN radical; and n is a whole number preferably greater than 1 and less than 25 for water soluble polymers, but higher for polymers soluble in stronger organic solvents.

An object of this embodiment of the invention is to provide polysulfhydrylated polymers of type II corresponding to the general formula indicated above, in which R' and R'' both represent a hydrogen atom and in which R''' represents an —$OCOCH_3$ radical, a —$COOCH_3$ radical, or a —CN radical.

A further object of this embodiment of the invention is to provide polysulfhydrylated polymers of type II corresponding to the above general formula in which R' represents a hydrogen atom, R'' represents a —$CH_3$ radical and R''' represents the —$COOCH_3$ radical.

In order that this portion of the invention may be clearly understood, several detailed embodiments thereof will be described in the following examples, purely by way of illustration without limiting the scope of the invention to the details thereof.

EXAMPLE 12

A composition having the following repeating formula is prepared:

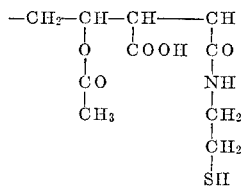

This is accomplished, as hereinafter described, by condensing β-mercaptoethylamine on a maleic anhydride/vinyl acetate copolymer.

The starting product is a vinyl acetate/maleic anhydride copolymer produced in a conventional manner by copolymerizing in toluene equimolecular quantities of vinyl acetate and maleic anhydride in the presence of benzoyl peroxide, which acts as a catalyst.

The vinyl acetate/maleic anhydride copolymer, used in the present example in a 1% solution in dimethylformamide and at a temperature of 25° C., has a specific viscosity of 0.17.

The molar ratio between the vinyl acetate and maleic anhydride in this copolymer has been found by measurement of the anhydride function to be 0.93/1.

In order to effect condensation of the β-mercaptoethylamine, 11.35 g. (0.1 mols of β-mercaptoethylamine hydrochloride and 120 cm.³ of water are placed in a flask provided with agitating means, a thermometer, a tube for introducing nitrogen, and a dropping funnel.

10 cm.³ (0.1 mol) of an aqueous 40% sodium hydroxide solution are added so as to liberate the amine from the hydrochloride.

8.9 g. (0.05 mol) of the vinyl acetate/maleic anhydride copolymer and 5 cm.³ (0.05 mol) of an aqueous 40% sodium hydroxide solution, are then added, while agitating and cooling, so as to liberate the amine salifying the carboxyl of the copolymer.

8.9 g. (0.05 mol) of the vinyl acetate/maleic anhydride copolymer and 5 cm.³ (0.05 mol) of an aqueous 40% sodium hydroxide solution are then added simultaneously.

After waiting three hours the mixture is acidified with concentrated hydrochloric acid, washed with water, and dried, thus producing a yield of 83% by weight, i.e. 21.2 g., of a white powder which is soluble in water at an alkaline pH.

The resulting product was analyzed as follows: SH percent calculated, 12.95; SH percent found, 7.13.

A further measurement of the SH, after reduction of any radicals containing oxidized SH which remained, 12.95; SH percent found, 12.17.

EXAMPLE 13

A polysulfhydrylated polymer having the following repeating formula is prepared:

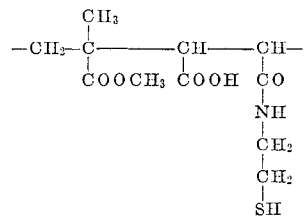

by reacting, as indicated, β-mercaptoethylamine and a maleic anhydride/methyl metacrylate copolymer.

For this purpose the methyl methacrylate/maleic anhydride copolymer used is obtained in a conventional manner by copolymerizing in toluene equi-molecular quantities of methyl methacrylate and maleic anhydride in the presence of diazo-isobutyronitrile, which acts as a catalyst.

The specific viscosity of this copolymer in a 1% solution in dimethylformamide is 0.088 at 25° C.

The molar ratio between the methyl methacrylate and maleic anhydride in this copolymer is determined by measuring the anhydride function to be 1.52/1.

The β-mercaptoethylamine is condensed on this copolymer in the same way as in Example 12.

A 70% yield by weight of a white powder which is soluble in water in an alkaline environment is obtained.

This product was analyzed as follows: SH percent calculated, 10.1; SH percent found, 4.45.

The oxydized SH functions were then reduced, and the following analysis made: SH percent calculated, 10.1; SH percent found, 6.15.

EXAMPLE 14

The following process is used to prepare a polysulfhydrylated copolymer having the repeating formula:

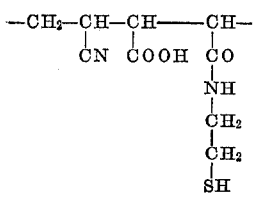

by condensing β-mercaptoethylamine on an acrylonitrile/maleic anhydride copolymer:

The process is started with an acrylonitrile/maleic anhydride copolymer obtained in a conventional manner by copolymerizing in toluene equi-molecular quantities of acrylonitrile and maleic anhydride in the presence of benzoyl peroxide, which acts as a catalyst.

The specific viscosity of this copolymer in a 1% solution in dimethylformamide is 0.055 at a temperature of 25° C.

The molar ratio between the acrylonitrile and the maleic anhydride in the copolymer is determined, by measurement of the anhydride function, to be 1.19/1.

In the same way as in Example 12, the β-mercaptoethylamine is condensed on this copolymer and a 50% yield by weight is obtained of a white powder which is soluble as follows: SH percent calculated, 13.9; SH percent found, in water in an alkaline environment. This was analyzed as follows: SH percent calculated, 13.9; SH percent found, 7.3.

After reducing the oxydized SH groups the analysis was: SH percent calculated, 13.9; SH percent found, 8.8.

EXAMPLE 15

A polysulfhydrylated polymer having the following repeating formula:

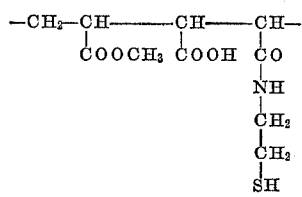

is prepared by condensing β-mercaptoethylamine on a methyacrylate/maleic anhydride copolymer in the following manner:

The methyacrylate/maleic anhydride copolymer used as a base is obtained in a conventional manner by polymerizing in toluene equi-molecular quantities of methyl acrylate and maleic anhydride in the presence of benzoyl peroxide, which acts as a catalyzer.

The specific viscosity of this copolymer in a 1% solution in dimethylformamide is 0.093 at a temperature of 25° C.

Measurement of the anhydride function shows that the molar ratio between the methyl acrylate and maleic anhydride in this copolymer is 0.9/1.

The β-mercaptoethylamine is condensed on the copolymer in the same way as in Example 12 with a yield of 67% by weight of a white powder which is soluble in water at an alkaline pH.

The powder thus obtained was analyzed with the following result: SH percent calculated, 13; SH percent found, 6.37.

After reduction of any oxidized SH groups the following analysis was made: SH percent calculated, 13; SH percent found, 7.47.

EXAMPLE 16

The polysulfhydrylated polymer having the following repeating formula:

is prepared by condensing N-methyl-β-mercaptoethylamine on an ethylene/maleic anhydride copolymer in the following manner:

The base product is the ethylene/maleic anhydride copolymer sold by the Monsanto Chemical Co. under the trademark "DX-840-11" resin.

The specific viscosity of this polymer in a 1% solution in dimethylformamide is 0.1 at 25° C.

Measurement of the anhydride function shows that the molar ratio between the ethylene and the maleic anhydride in this copolymer is 1.6/1.

To condense the N-methyl-β-mercaptoethylamine, 28.6 g. (0.184 mol) of N-methyl-β-mercaptoethylamine hydrochloride and 120 cm.$^3$ of water are placed in a flask provided with agitating means, a thermometer, and a dropping funnel.

18.4 cm.$^3$ (0.181 mol) of a 40% sodium hydroxide solution is added to liberate the amine from the hydrochloride.

13.25 g. (0.92 mol) of the ethylene/maleic anhydride copolymer and 9.2 cm.$^3$ (0.92 mol) of an aqueous 40% sodium hydroxide solution are added while agitating and cooling the mixture, so as to liberate the amine salifying the carboxyl of the copolymer.

13.25 g. (0.93 mol) of the copolymer and 9.2 cm.$^3$ (0.92 mol) of an aqueous 40% sodium hydroxide solution are then added simultaneously.

When the reaction has been completed, the mixture is acidified with concentrated hydrochloric acid, and the precipitate washed with water and dried.

This results in a yield of 90% by weight of a powder which is soluble in water in an alkaline enviroment.

The resulting product was then analyzed with the following result: SH percent calculated, 14; SH percent found, 5.75.

The product was also analyzed after reduction of the oxidized radicals, with the following results: SH percent calculated, 14. SH percent found, 9.05.

EXAMPLE 17

In order to permanently wave hair in accordance with the invention a solution having the following composition is prepared:

| | |
|---|---|
| Polymer resulting from the reaction of β-mercaptoethylamine and a maleic anhydride/vinyl acetate copolymer prepared as in Example 12 _____g__ | 12 |
| Urea _____g__ | 5 |
| Ammonia _____pH__ | 9.8 |
| Water q.s.p. _____g__ | 100 |

The hair is impregnated with this solution and rolled up on curlers in the usual way.

Each lock of hair is saturated with the above-described solution. Then, after waiting 10 to 15 minutes, the hair is carefully rinsed with hot water and fixed with hydrogen peroxide.

An excellent permanent wave results.

EXAMPLE 18

In order to permanently wave hair in accordance with the invention a solution having the following composition is prepared:

Polymer resulting from the reaction of β-mercapto-
ethylamine on the maleic anhydride/vinyl meth-
acrylate copymer obtained in the process described
in Example 13 _____ g__ 9
Urea _____ g__ 5
Ammonia q.s.p. _____ pH__ 9.4
Water q.s.p. _____ g__ 100

The hair is impregnated with this solution in the same way as in Example 17 except that no oxidizing solution is applied.

After the conventional waiting period one need only rinse the hair copiously for at least two minutes with hot water.

This produces a permanent wave which is of excellent quality and holds up for a long time.

EXAMPLE 19

The following composition is prepared to treat the hair in accordance with the invention:

Polysulfhydrylated polymer obtained by condensa-
tion of β-mercaptoethylamine on an acrylonitrile/
maleic anhydride copolymer as in Example 14 _g__ 13
Urea _____ g__ 6
Ammonia _____ pH__ 9
Water q.s.p. _____ g__ 100

This solution gives excellent results when used for "warm" permanents.

In this technique a conventional device is attached to each curler which brings it to a temperature of 65–90° C. No oxidizing lotion is used, but a pronounced, long lasting wave results.

EXAMPLE 20

A solution having the following composition is prepared for use as a setting lotion:

Sulfhydrylated polymer resulting from the reaction
of N-methyl-β-mercaptoethylamine and the maleic
anhydride/ethylene copolymer according to Exam-
ple 16 _____ g__ 12
Ammonia q.s.p. _____ pH__ 9.6
Water q.s.p. _____ g__ 100

The hair is impregnated with this solution and set in a conventional manner.

The hair is permanently deformed and the resulting set holds much better than those effectuated in the usual way.

This setting operation comprises the following steps:

Moistening
Rolling up on curlers
Evaporation of the ammonia, and during this process part of the disulfide polymers remain on the fiber, so that the hereinbefore mentioned properties are imparted to the hair in a very simple way.

What is claimed is:

1. A water soluble polysulfhydrylated polymer having keratin reactive SH groups having the recurring formula

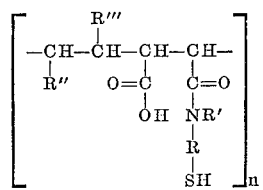

in which R is selected from the group consisting of alkylene having 2 to 4 carbon atoms, lower alkyl substituted lower alkylene, carboxy-substituted lower alkylene and carbalkoxy substituted lower alkylene, R' is selected from the group consisting of hydrogen and lower alkyl, R'' and R''' are selected from the group consisting of hydrogen, lower alkyl, phenyl and lower alkoxy, and $n$ is less than 25 and more than 1.

2. A water soluble polysulfhydrylated polymer having keratin reactive SH groups having the formula:

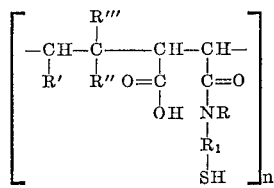

in which:

$R_1$ is selected from the group consisting of alkylene having from 2 to 4 carbon atoms, 1 to 4 carbon atom alkyl substituted alkylene, carboxyl substituted alkylene, and carbalkoxy substituted alkylene;

R is selected from the group consisting of hydrogen and lower alkyl;

R' and R'' are selected from the group consisting of hydrogen, lower alkyl, phenyl and lower alkoxy;

R''' is selected from the group consisting of

—OCOCH₃

—COOCH₃ and —CN, and $n$ is an integer less than 25 and more than 1.

3. The polymer of claim 2, in which R' and R'' each represent a hydrogen atom and R''' represents the —OCOCH₃ group.

4. The polymer of claim 2 in which R' represents a hydrogen atom R'' represents the —CH₃ group, and R''' represents the —COOCH₃ group.

5. The polymer of claim 2 in which R' and R'' each represent an atom of hydrogen and R''' represents the —CN group.

6. The polymer of claim 2 in which R' and R'' each represent a hydrogen atom and R''' represents the —COOCH₃ group.

References Cited

UNITED STATES PATENTS

| | | | |
|---|---|---|---|
| 2,313,565 | 3/1943 | McDowell et al. | 260—78 |
| 2,977,334 | 3/1961 | Zopf et al. | 260—27 |
| 3,257,361 | 6/1966 | Mishel et al. | 260—79.5 |
| 3,230,144 | 1/1966 | Jensen et al. | 167—87.1 |

FOREIGN PATENTS 1,349,140  3/1962  France.

OTHER REFERENCES

Chemical Abstracts, 61, 1704h.

JOSEPH L. SCHOFER, Primary Examiner

C. A. HENDERSON, JR., Assistant Examiner

U.S. Cl. X.R.

8—127.51, 128; 424—72